July 8, 1958      J. C. KELLY      2,841,864
METHOD OF MAKING FRICTION BAND ASSEMBLIES
Filed May 23, 1955      5 Sheets-Sheet 1

INVENTOR.
JOHN. C. KELLY.
BY

July 8, 1958 J. C. KELLY 2,841,864
METHOD OF MAKING FRICTION BAND ASSEMBLIES
Filed May 23, 1955 5 Sheets-Sheet 2

INVENTOR.
JOHN. C. KELLY.
BY

July 8, 1958 J. C. KELLY 2,841,864
METHOD OF MAKING FRICTION BAND ASSEMBLIES
Filed May 23, 1955 5 Sheets-Sheet 3
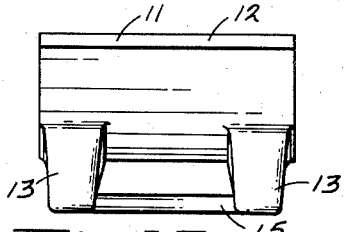
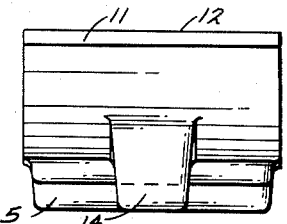
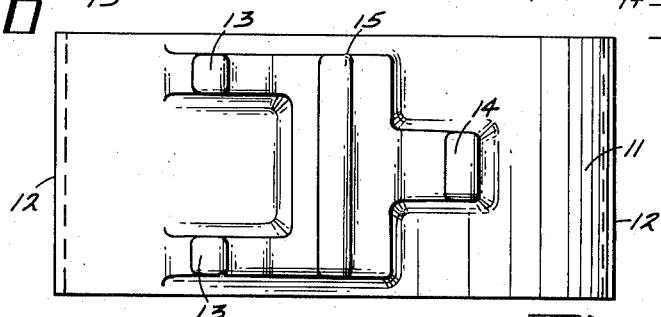
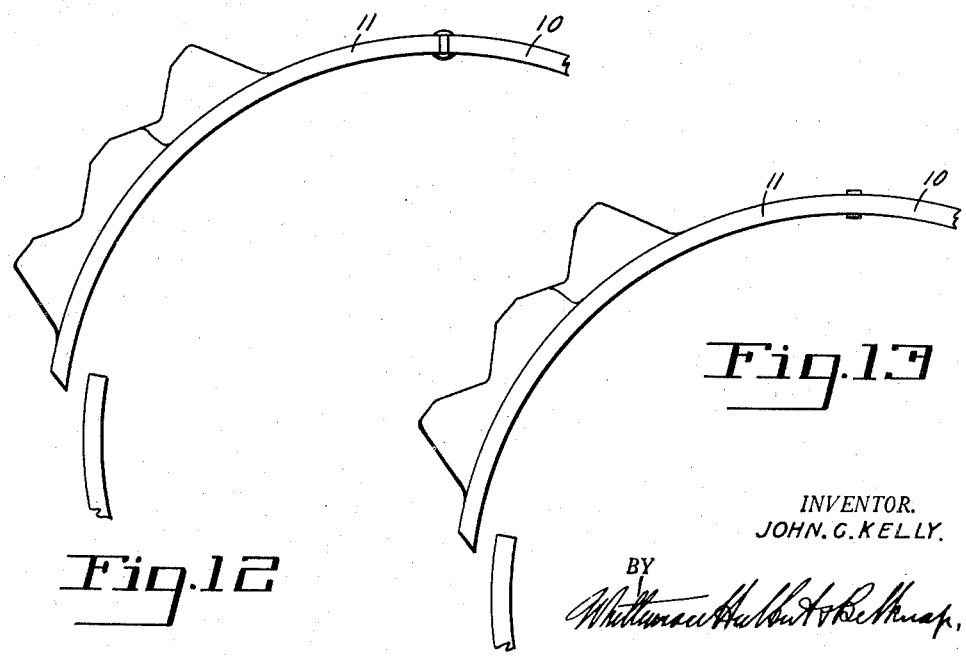
INVENTOR.
JOHN. C. KELLY.
BY July 8, 1958   J. C. KELLY   2,841,864
METHOD OF MAKING FRICTION BAND ASSEMBLIES
Filed May 23, 1955   5 Sheets-Sheet 4

INVENTOR.
JOHN C KELLY
BY

July 8, 1958　　　　J. C. KELLY　　　　2,841,864
METHOD OF MAKING FRICTION BAND ASSEMBLIES
Filed May 23, 1955　　　　　　　　　　5 Sheets-Sheet 5
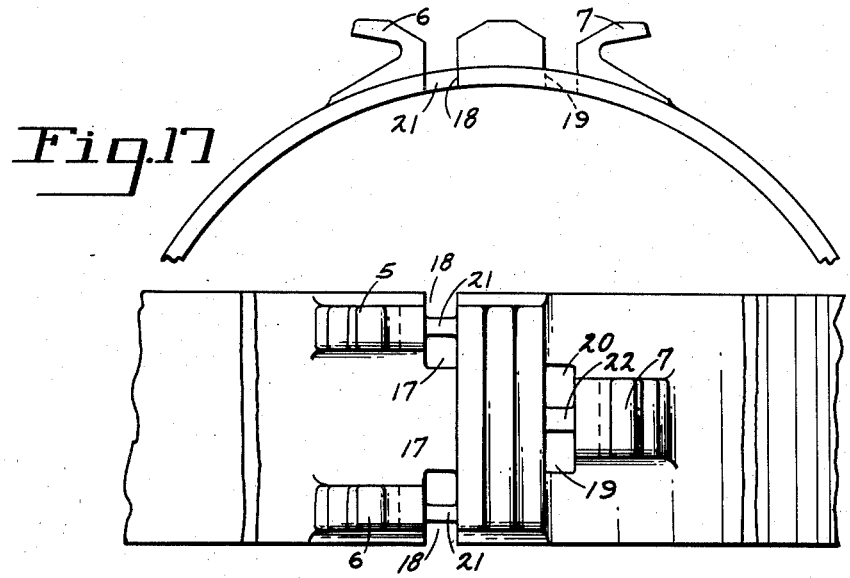
Fig.17
Fig.18
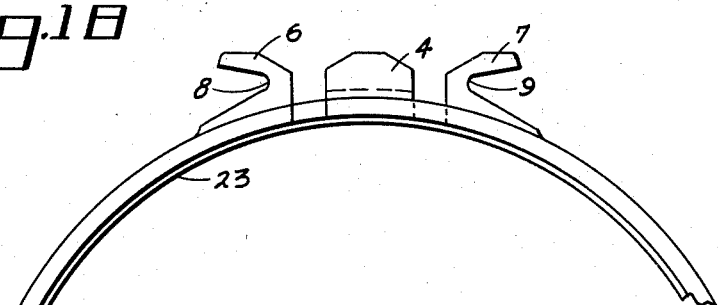
Fig.19
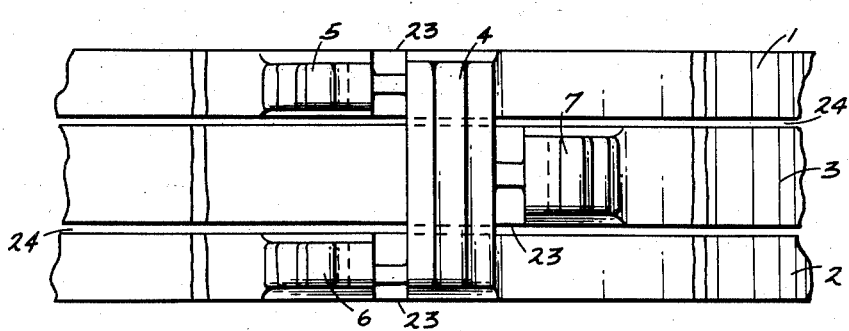
Fig.20
INVENTOR.
JOHN.C.KELLY.
BY

United States Patent Office 2,841,864
Patented July 8, 1958

2,841,864

METHOD OF MAKING FRICTION BAND ASSEMBLIES

John C. Kelly, Jackson, Mich., assignor to Kelsey-Hayes Company, a corporation of Delaware Application May 23, 1955, Serial No. 510,243

3 Claims. (Cl. 29—418)

The invention relates to the manufacture of friction band assemblies and refers more particularly to the manufacture of friction band assemblies for use in transmissions.

The invention has for an object to provide an improved method of making a friction band assembly which comprises employing steps which may be readily carried out to produce a one-piece three-band assembly.

This and other objects of the invention will become apparent from the following description and accompanying drawings in which—

Figure 1:
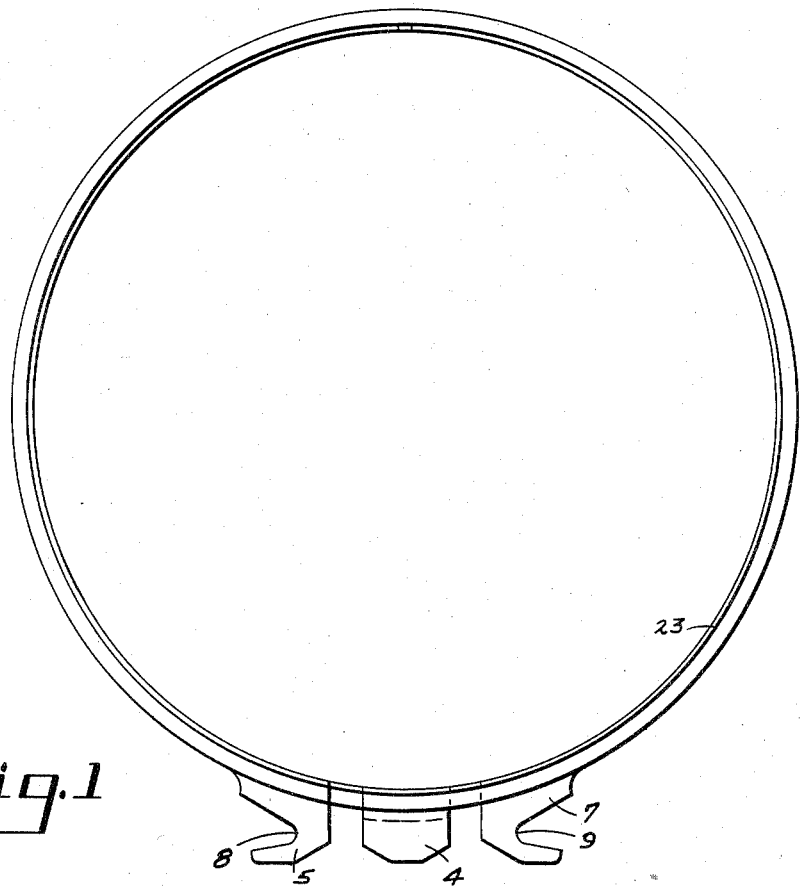
Figure 1 is an edge elevation of a friction band assembly made in accordance with the method embodying the invention.
Figure 2:
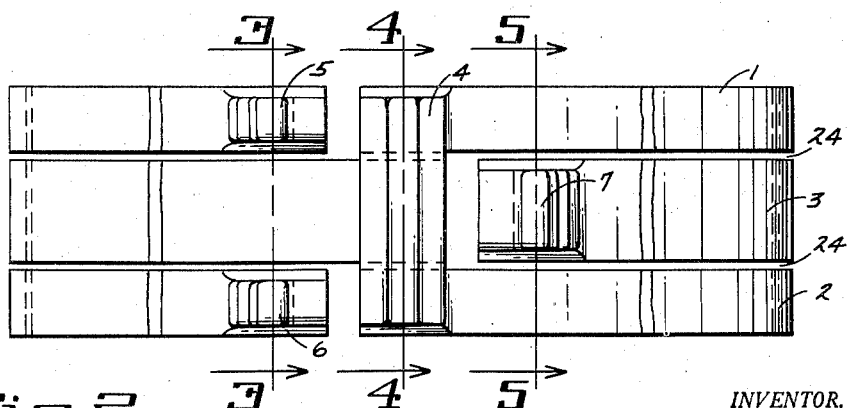
Figure 2 is a plan view of a portion thereof.
Figure 3:
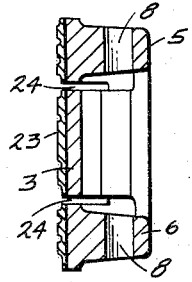
Figure 4:
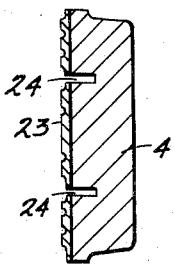
Figure 5:
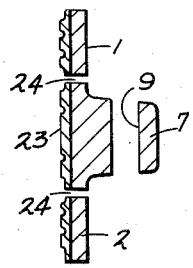
Figure 6:
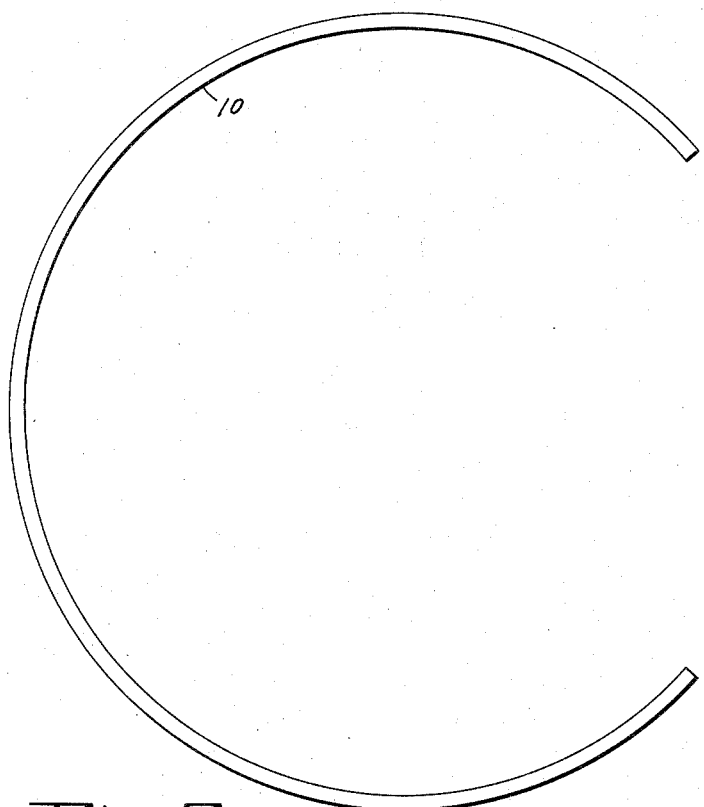
Figure 7:
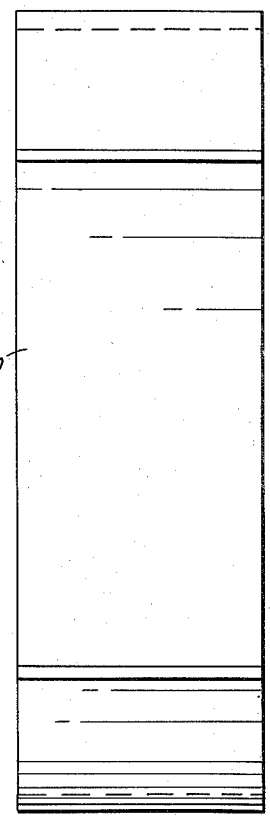
Figure 15:
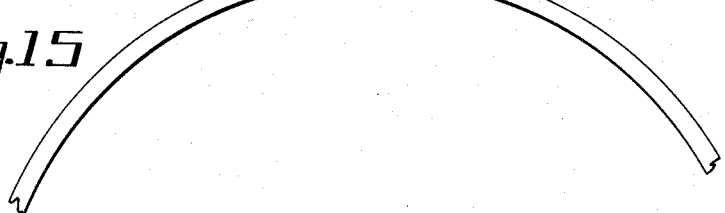
Figure 16:
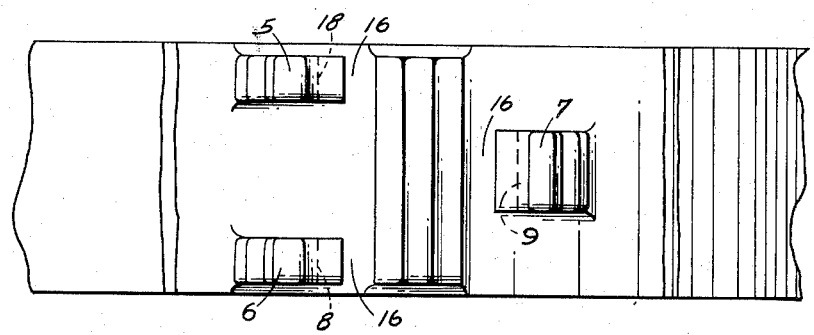

Figures 3, 4 and 5 are cross sections on the lines 3—3, 4—4 and 5—5 respectively of Figure 2;

Figure 6 is an edge elevation of a hooped band used in the manufacture of the assembly;

Figure 7 is a side elevation thereof;

Figure 8 is an edge elevation of a segment used in the manufacture of the assembly;

Figures 9 and 10 are opposite end views thereof;

Figure 11 is a plan view thereof;

Figures 12, 13, 14, 15, 17 and 19 are edge elevations illustrating various steps in the manufacture;

Figures 16, 18 and 20 are plan views respectively of Figures 15, 17 and 19.

The friction band assembly illustrated in Figures 1 to 5, inclusive, and manufactured in accordance with the method embodying the invention comprises, in effect, a one-piece three-band assembly having the outside bands 1 and 2 and the middle band 3, the outside bands being connected at one end to the ends of the transverse tie 4 and the middle band being connected at the other end to the middle of the transverse tie at the side opposite its connection to the outside bands. The free ends of the outside bands 1 and 2 have secured thereto the outwardly projecting ears 5 and 6 while the free end of the middle band 3 has secured thereto the outwardly projecting ear 7. The ears 5 and 6 are provided with the notches 8 opening laterally away from the transverse tie 4 and the ear 7 is provided with the notch 9 also opening laterally away from the transverse tie 4 and in a direction opposite to that of the notches 8. The notches 8 and 9 are engageable with struts of the transmission for which the assembly is designed and the construction is such that upon relative movement of the struts toward each other the ears 5 and 6 and the ear 7 are moved circumferentially toward each other to engage the outside and middle bands with a part of the transmission to hold the same from rotation.

In the manufacture of the friction band assembly the ends of a band 10 and a segment 11 are butt-welded to each other. The band 10, as shown particularly in Figures 6 and 7, is a hooped steel band having a predetermined gap between its ends. The segment 11, as shown particularly in Figures 8, 9, 10 and 11, is a coined forging having a base formed with a concave inner surface of one radius and with the arcuate end extensions 12, a pair of laterally spaced ears 13 extending from the outer surface of the base, a single ear 14 extending from the outer surface of the base in circumferential alignment with the space between the pair of ears 13 and a spacer 15 also extending from the outer surface of the base and located circumferentially between the pair of ears 13 and the single ear 14. The ears 13 and 14 are located between the arcuate extensions 12. The pair of ears connect into the ends of the spacer and the single ear connects into the middle of the spacer at the side opposite the pair of ears.

Figure 14:
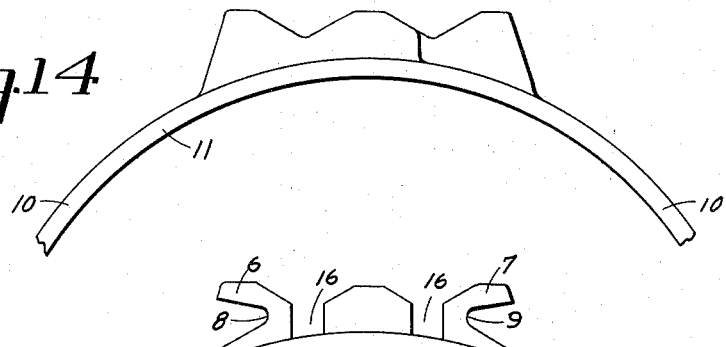

As before stated, the ends of the band 10 and the segment 11 are butt-welded together and this is accomplished with the inner surface of the segment in continuation with the inner surface of the band. After the butt-welding, the weld flash, especially at the inside of the band and segment assembly, is completely removed preferably by burr cutting and subsequent coining. Preferably the butt-welding is accomplished in two steps: first, by butt-welding one end of the band 10 to one end of the segment 11 as shown in Figure 12, and then butt-welding the other end of the band to the other end of the segment. After each butt-welding step the weld flash is burr cut both at the inside and outside of the assembly, as shown in Figure 13, and after the burr cutting of both weld flashes the coining step is carried out, as shown in Figure 14, to coin any flash remaining at the inside of the assembly into flush relationship with the inside surface of the assembly.

The assembly is then expanded to size and made cylindrical and the side edges of the assembly are ground after which, as shown in Figures 15 and 16, the spacer 15 is broached to form the two slots 16 extending transversely of the assembly at the inner ends of the ears 5 and 6 and the ear 7, the ears 5 and 6 are broached to form the notches 8 and the ear 7 is broached to form the notch 9. The next step consists in piercing the bottoms of the slots 16 radially of the assembly, as shown in Figures 17 and 18, to form the pair of laterally inner and outer openings 17 and 18 respectively at the end of each ear 5 and 6 and the pair of openings 19 and 20 at the end of the ear 7, there being circumferentially extending tie bars 21 between the openings 17 and 18, and a circumferentially extending tie bar 22 between the openings 19 and 20. The burrs formed by this piercing step are removed and then the internal diameter of the assembly is shot peened to condition the internal surface for subsequent bonding of the lining and to stress the assembly and especially the band so that it is inherently expansive.

The friction lining 23 is then coiled and assembled within and bonded to the band and segment assembly. In the present instance, cycleweld cement is used and the usual steps are employed in the bonding operation. These steps comprise spraying cycleweld cement on the internal surface of the assembly, heating in an oven, coiling and assembling the friction lining within the assembly with the space between the ends of the friction lining diametrically opposite the circumferential center of the segment and bonding the friction lining to the assembly on a heating fixture. After the bonding, the internal diameter of the lining is bored and the usual grooves are cut in its inner surface.

The lined assembly with the exception of the transverse tie 4, which is a rib forming the radially outer part of the spacer 15, is then circumferentially severed to form the outside bands 1 and 2 and the middle band 3. The severing is accomplished by sawing two circumferential slots 24 in the lined assembly extending past the laterally inner or opposed sides of the ears 5 and 6 and the opposite sides of the ear 7 in laterally spaced relation to the tie bars 21 and 22 throughout the circumferential extents of the band 10 and the segment 11 including the laterally inner openings 17, the openings 19 and 20 and the radially inner part of the spacer 15. Figures 19 and 20 show the assembly at the end of this step with the tie bars 21 and 22 holding the adjacent ends of the outside and middle bands to the spacer 15. Then the tie bars 21 and 22 are removed by being cut out and the lining is pierced in registration with the openings 17 and 18 and the openings 19 and 20 and the spaces previously occupied by the tie bars 21 and 22 and the assembly automatically expands thereby opening to a greater extent the transverse gaps at the free ends of the outside and middle bands. Any burrs remaining from this operation are removed and the one-piece three-band assembly of Figures 1 to 5, inclusive, is complete.

What I claim as my invention is:

1. The method of making a friction band assembly which comprises butt-welding the ends of a hooped band to the ends of a segment having a transverse spacer formed with a radially outer transverse tie, laterally spaced ears at one side of the spacer and a single ear at the other side of the spacer, the single ear being in circumferential alignment with the space between the laterally spaced ears, removing the weld flash at the ends of the segment and inside the assembly, sizing the assembly by expansion, broaching the spacer to form slots extending transversely of the assembly at the inner ends of the ears, piercing the bottoms of the slots adjacent the inner ends of the ears to form openings separated by circumferentially extending tie bars extending from the ears, peening the inner surface of the assembly, securing a friction lining to the inner surface of the assembly, circumferentially severing the lined assembly at opposite sides of the single ear and laterally spaced from the tie bars to form two axially spaced substantially co-extending slots in the lined segment and band including the pierced openings adjacent the single ear and the laterally innermost pierced openings adjacent the laterally spaced ears and terminating at the ends in the lined segment at opposite sides of the spacer, and then cutting out the tie bars and piercing the lining in registration with the openings and the spaces formerly occupied by the tie bars to form three axially spaced bands, the outer bands being integral with the spacer on one side thereof and the inner band being integral with the other side of said spacer and allowing the assembly to automatically expand.

2. The method of making a three-in-one friction band assembly which comprises forming a segment having a concave inner surface and having on the outer surface a transverse spacer, laterally spaced ears at one side of the spacer, and a single ear in circumferential alignment with the space between the laterally spaced ears, forming a transversely split hooped band, welding the ends of the segment to the ends of the band in abutting end-to-end relation with the inner surface of the segment in continuation of the inner surface of the band to provide an endless segment and band assembly, sizing the assembly by expansion, securing a friction lining to the inner surface of the assembly, severing the lined segment and band circumferentially at axially spaced points along lines between the laterally spaced ears and at opposite sides of the single ear extending continuously from one side of the spacer to the other, and transversely severing the lined segment at the inner ends of the laterally spaced ears from the edges of the lined segment to the circumferential lines of severing and also at the inner end of the single ear between the circumferential lines of severing to form three axially spaced bands, the outer bands being integral with the spacer on one side thereof and the inner band being integral with the other side of said spacer.

3. The method of making a friction band assembly which comprises forming a segment having a concave inner surface and a central portion which projects radially outward, forming a transversely split hooped band, butt welding the ends of the segment to the ends of the hooped band in abutting end-to-end relation with the inner surface of the segment in continuation of the inner surface of the band to provide an endless band and segment assembly, sizing the assembly by expansion, securing a friction lining to the inner surface of the assembly, circumferentially severing the lined assembly at spaced axial points to form axially spaced slots in the lined segment and band terminating at the ends in the lined segment at opposite sides of said central portion, and transversely severing the lined segment adjacent the ends of said slots at opposite sides of said central portion to form axially spaced bands alternately connected at one end only to opposite sides of said central portion.

References Cited in the file of this patent
UNITED STATES PATENTS

| 1,864,929 | Peterson | June 28, 1932 |
| 2,020,441 | Steward | Nov. 12, 1935 |
| 2,124,850 | Drake | July 26, 1938 |
| 2,693,021 | Sinclair | Nov. 2, 1954 |
| 2,697,274 | Merrill | Dec. 21, 1954 |